Patented May 19, 1931

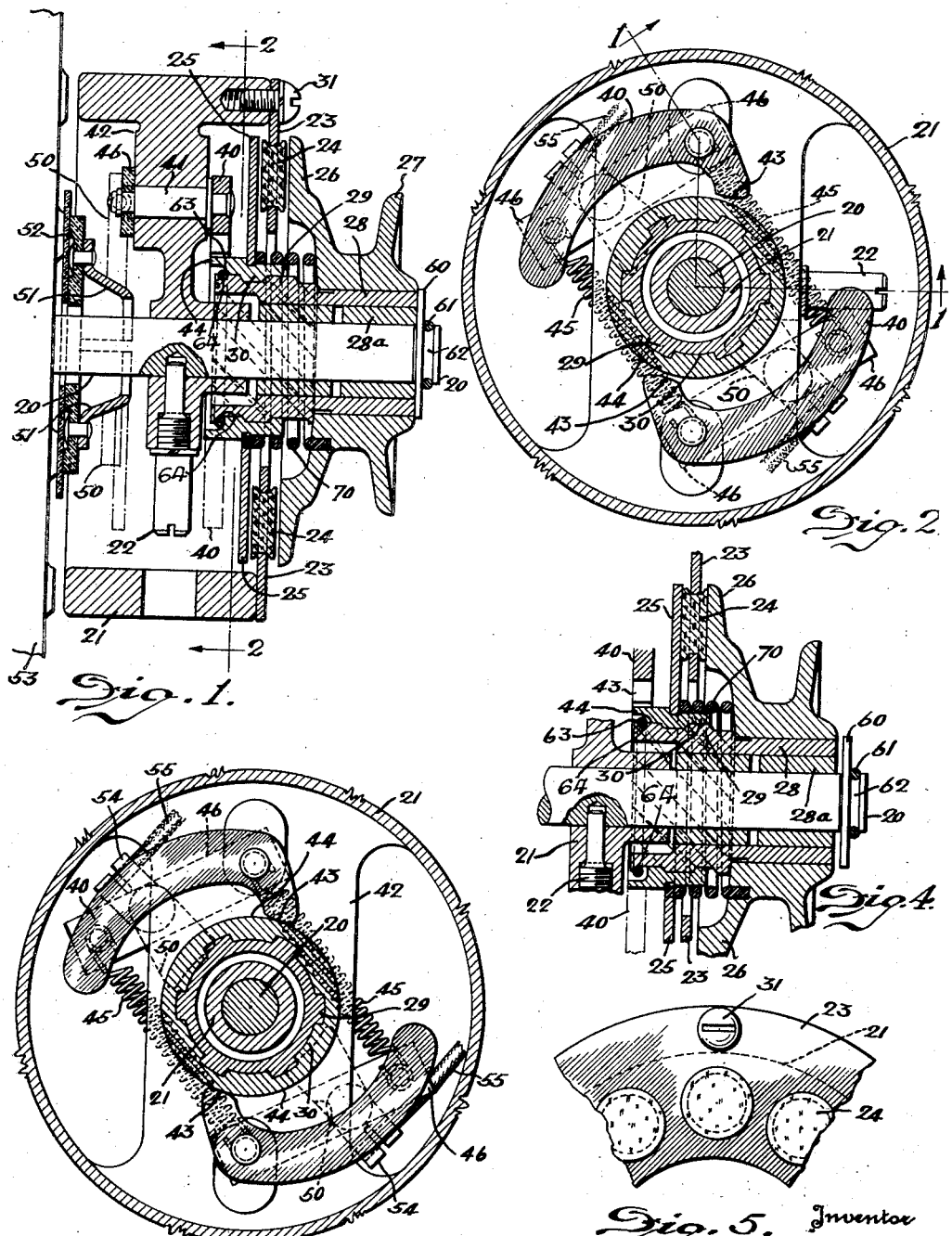

1,806,332

UNITED STATES PATENT OFFICE

WILLIAM A. CHRYST, OF DAYTON, OHIO, ASSIGNOR TO DELCO-REMY CORPORATION, OF DAYTON, OHIO, A CORPORATION OF DELAWARE

CENTRIFUGAL CLUTCH

Application filed July 5, 1928. Serial No. 290,417.

This invention relates to centrifugal clutches for connecting a driving member with a member to be driven after a certain speed of the driving member has been attained.

One of the objects of the present invention is to provide an improved centrifugal clutch which is rugged and durable in construction, reliable in operation and which may be produced at relatively low cost.

Another object of the invention is to provide a unitary structure for connecting a power operated shaft with mechanism to be driven thereby, said unitary structure comprising a flywheel and means for connecting it with the power operated shaft, a pulley or other power transmitting member and a centrifugal clutch for connecting said flywheel with the pulley.

Further objects and advantages of the present invention will be apparent from the following description, reference being had to the accompanying drawings wherein a preferred embodiment of one form of the present invention is clearly shown.

In the drawings:

Fig. 1 is a longitudinal sectional view of a unitary structure embodying the present invention and comprising a centrifugal clutch and centrifugal switch, and section is taken on line 1—1 of Fig. 2.

Figs. 2 and 3 are sectional views taken on the line 2—2 of Fig. 1, and show, respectively, the clutch disengaged and the switch closed, and the clutch engaged and the switch open.

Fig. 4 is a fragmentary longitudinal sectional view of certain parts shown in Fig. 1, and shows the clutch in engaged position.

Fig. 5 is a fragmentary side view of one of the clutch plates.

The unitary power transmitting structure which may be attached to a driving shaft indicated by numeral 20 comprises a flywheel 21 attached by a set screw 22 to the shaft 20, a driving clutch plate 23 having friction inserts 24, driven clutch plates 25 and 26 and a pulley or other transmitting device 27 which is preferably integral with the clutch plate 26. The pulley 27 is attached by press fitting or any other suitable manner to a sleeve 28 provided with a screw-threaded portion 29 engaged by a nut 30 which is attached to the plate 25. The driving disk 23 is attached to the flywheel 21 by screws 31 which may pass loosely through holes near the periphery of the disk 23 and which provide for slight axial movement of the disk 23 if desired in order that the disk 23 may accommodate itself to the surfaces of the driven plates 25 and 26 when the clutch is tightened as shown in Fig. 4.

It is obvious from the drawings that the clutch member 24 will be clamped between the clutch plates 25 and 26 by the operation of screwing the sleeve 28 into the nut 30. This is accomplished by connecting the nut 30 to the flywheel 21 by means responsive to speed. The speed responsive means comprises weights 40 attached to shafts 41 which are journalled in the web 42 of the flywheel 21. Each weight has an arm 43 for frictionally engaging a drum 44 integral with the nut 30 when the weights 40 have moved by centrifugal force into clutch engaging position as shown in Fig. 3. The pulley 27 being normally stationary due to its connection by a belt not shown with a mechanism to be driven, the result of frictionally connecting the nut 30 with the flywheel 21 by the operation of the weights 40 is to cause the sleeve 28 to be threaded into the nut 30, and hence to cause the clutch plate inserts 24 to be gripped between the clutch plates 25 and 26. In this manner, the shaft 20 is drivingly connected with the pulley 27 after a predetermined speed of the flywheel 21 has been attained. Outward movement of the weights 40 is resisted by springs 45 each having one end attached to a weight shaft 41 and the other attached to a non-conducting lever 46 which is connected with another weight shaft 41 so as to rotate therewith. Therefore as the speed of the shaft 20 decreases the springs 45 will be effective to move the weights 40 inwardly and to disconnect the sleeve 28 from the flywheel 21.

In order that a starting circuit for an electric motor used to drive the shaft 20 may be controlled concurrently with the control of the clutch, the weights 40 also move switch contact brushes 50, each connected with a non-conducting lever 46, out of contact with a pair of annular segmental switch contacts 51 insulatingly supported by a non-conducting ring 52 attached to the frame of the motor indicated by numeral 53. Clips 54 and wire 55 connect the contact brushes 50. Springs 45 are normally effective to maintain the contact brushes 50 in engagement with the contacts 51 until a certain speed has been obtained. The switch contacts 51 are in the starting circuit of the motor, and the gaps between the contacts 51 are so located relative to the contact brushes 50 that, so long as the brushes 50 are in normal position, at least one of the brushes 50 will bridge across the contacts 51. Therefore before a certain speed is attained, the starting circuit will remain closed and operative.

When the clutch is transmitting motion from the flywheel to the pulley, a spring 70, located between the nut 30 and the sleeve 28 and attached by its ends with said parts, is in a state of compression and torsion. When the speed of the flywheel decreases to such a value, the friction between the arms 43 and the nut 30 is so slight that the spring 70 is permitted to be released, and to produce relative rotation between the nut and sleeve in such direction as to cause them to be separated. Endwise movement of the sleeve 28 toward the right is limited by a stop washer 60 retained by a wire split ring 61 received by a groove 62 in the shaft 20. Endwise movement of the nut 30 toward the left is limited by a wire split-ring 63 carried in a groove 64 in the sleeve 28. In this way the flywheel is automatically disconnected from the pulley when the flywheel speed decreases to a certain amount.

As the speed of the shaft 20 decreases the springs 45 are permitted to return the contacts 50 into engagement with the contacts 51, so as to restore the starting circuit of the motor.

The flywheel, pulley, clutch and movable contacts of the switch comprise a unitary structure which can be placed upon or removed from the shaft in assembled relation.

While the form of embodiment of the present invention as herein disclosed, constitutes a preferred form, it is to be understood that other forms might be adopted, all coming within the scope of the claims which follow.

What is claimed is as follows:

1. A centrifugal clutch comprising, in combination, coaxially rotatable driving and driven members, one having axial movement relative to the other; nut-and-screw provisions connected with the driven member for frictionally engaging the members by threading one part relative to the other; and a speed responsive device connected with the driving member for frictionally connecting one part of the nut-and-screw provisions with the driving member in order to effect relative movement between the nut-and-screw to cause the clutch members to be engaged.

2. A centrifugal clutch comprising, in combination, coaxially rotatable driving and driven members, one having axial movement relative to the other; nut-and-screw provisions connected with the driven member for frictionally engaging the members by threading one part relative to the other; and a speed responsive device connected with the driving member for frictionally connecting the nut member with the driving member in order to effect relative movement between the nut-and-screw to cause the clutch members to be engaged.

3. A centrifugal clutch comprising, in combination, coaxially rotatable driving and driven members; clutch means for connecting said members and comprising clutch end plates connected with the driven member, and an intermediate plate located between the end plates and connected with the driving member; and a speed responsive device operated by the driving member for causing the intermediate plate to be gripped between the end plates.

4. A centrifugal clutch comprising, in combination, coaxialy rotatable driving and driven members; clutch means for connecting said members and comprising clutch end plates connected with the driven member, and an intermediate plate located between the end plates and connected with the driving member; and a speed responsive device operated by the driving member for causing both end plates to move axially into engagement with the intermediate plate.

5. A centrifugal clutch comprising, in combination coaxially rotatable driving and driven members; nut-and-screw parts, one part being connected with the driven member; clutch end plates attached respectively to the nut-and-screw parts; an intermediate plate located between the end plates and connected with the driving member; and speed responsive means for connecting one of said nut and screw parts with the driving member in order to cause nut and screw to be threaded relative to each other and the intermediate plate to be gripped between the end plates.

6. A centrifugal clutch comprising, in combination, coaxially rotatable driving and driven members; nut and screw parts, one part being connected with the driven member; end plates attached respectively to the nut and screw parts; an intermediate plate located between the end plates and connected with the driving member and weights supported by the driving member for lateral movement relative thereto and having portions for frictionally engaging one of the nut and screw parts in order to cause nut and screw to be threaded relative to each other and the intermediate plate to be gripped between the end plates.

7. A centrifugal clutch comprising, in combination, coaxially rotatable driving and driven members; a screw part connected with the driven member; a nut threaded on said screw part; clutch end plates attached respectively to said screw and nut parts; an intermediate clutch plate located between the end plates and attached to the driving member; and speed responsive means for connecting the nut part with the driving member in order to cause nut and screw to be threaded relative to each other and the intermediate plate to be gripped between the end plates.

8. A centrifugal clutch comprising, in combination, coaxially rotatable driving and driven members; a screw part connected with the driven member; a nut threaded on said screw part; clutch end plates attached respectively to said screw and nut parts; an intermediate clutch plate located between the end plates and attached to the driving member; and weights supported by the driving member for lateral movement relative thereto and having portions for frictionally engaging the nut part in order to cause nut and screw to be threaded relative to each other and the intermediate plate to be gripped between the end plates.

9. A centrifugal clutch comprising, in combination, a drive shaft; a screw-threaded sleeve rotatable about the shaft; a nut threaded on the sleeve; a driven member connected with the sleeve; a clutch driving-plate connected with the drive shaft; a clutch driven-plate connected with the sleeve; and speed responsive means operated by the shaft for connecting the nut with the shaft in order to thread the nut and sleeve relative to each other and to cause the clutch plates to be engaged.

10. A centrifugal clutch comprising, in combination, a drive shaft; a screw-threaded sleeve rotatable about the shaft and axially movable along the shaft; a nut threaded on the sleeve; a driven member connected with the sleeve; a clutch driving plate connected with the drive shaft; a clutch driven plate connected with the sleeve; means limiting axial movement of the nut; and speed responsive means operated by the shaft for connecting the nut with the shaft in order to thread the nut relative to the sleeve and to cause the sleeve to be moved axially by the nut and the clutch plates to be engaged.

11. A centrifugal clutch comprising, in combination, a drive shaft; a screw-threaded sleeve rotatable about the shaft and axially movable along the shaft; a nut threaded on the sleeve; a driven member connected with the sleeve; a clutch driving plate connected with the drive shaft; a clutch driven plate connected with the sleeve; means limiting axial movement of the sleeve; and speed responsive means operated by the shaft for connecting the nut with the shaft in order to thread the nut relative to the sleeve and to cause the nut to be moved axially by the sleeve and the clutch plates to be engaged.

12. A centrifugal clutch comprising, in combination, a drive shaft; a screw-threaded sleeve rotatable about the shaft and axially movable along the shaft; a nut threaded on the sleeve; a driven member connected with the sleeve; a clutch driving plate connected with the drive shaft; a clutch driven plate connected with the sleeve and located at one side of the driving plate; a driven plate connected with the nut and located at the other side of the driving plate; and speed responsive means operated by the shaft for connecting the nut with the shaft in order to thread the nut relative to the sleeve and to cause the sleeve and the nut to move axially toward the driving plate and the latter to be gripped between the driven plates.

13. A centrifugal clutch comprising, in combination, coaxially rotatable driving and driven members, one having axial movement relative to the other; nut-and-screw provisions connected with one of said members for frictionally engaging the other of said members by threading one part relative to the other; and a speed responsive device connected with the driving member cooperating with one part of the nut-and-screw provision in order to effect relative movement between the nut-and-screw to cause the clutch members to be engaged.

14. A centrifugal clutch comprising, in combination, coaxial rotatable driving and driven members, one having axial movement relative to the other; nut-and-screw provisions connected with one of the members for frictionally engaging the other of said members by threading one part relative to the other; and a speed responsive device connected with the driving member cooperating with said nut member in order to effect relative movement between the nut-and-screw to cause the clutch members to be engaged.

In testimony whereof I hereto affix my signature.

WILLIAM A. CHRYST.